(12) United States Patent
Torii et al.

(10) Patent No.: US 9,790,979 B2
(45) Date of Patent: Oct. 17, 2017

(54) SELF-TAPPING SCREW

(76) Inventors: Shingo Torii, Kyoto (JP); Masanori Yokota, Kyoto (JP); Masanori Abe, Kyoto (JP)

(*) Notice: Subject to any disclaimer, the term of this patent is extended or adjusted under 35 U.S.C. 154(b) by 0 days.

(21) Appl. No.: 14/114,455

(22) PCT Filed: Apr. 28, 2011

(86) PCT No.: PCT/JP2011/060474
§ 371 (c)(1),
(2), (4) Date: Oct. 28, 2013

(87) PCT Pub. No.: WO2012/147207
PCT Pub. Date: Nov. 1, 2012

(65) Prior Publication Data
US 2014/0044499 A1 Feb. 13, 2014

(51) Int. Cl.
*F16B 25/06* (2006.01)
*F16B 25/00* (2006.01)

(52) U.S. Cl.
CPC ...... *F16B 25/0057* (2013.01); *F16B 25/0015* (2013.01); *F16B 25/0021* (2013.01); *F16B 25/0047* (2013.01); *F16B 25/0073* (2013.01)

(58) Field of Classification Search
CPC ............... F16B 25/001; F16B 25/0015; F16B 25/0021; F16B 25/0057; F16B 25/0073
USPC ........................................ 411/386
See application file for complete search history.

(56) References Cited

U.S. PATENT DOCUMENTS

| | | | | |
|---|---|---|---|---|
| 3,351,115 A | * | 11/1967 | Boehlow | 411/168 |
| 3,935,785 A | * | 2/1976 | Lathom | 411/413 |
| 5,282,708 A | * | 2/1994 | Giannuzzi | 411/386 |
| 5,795,120 A | * | 8/1998 | Hurdle | 411/386 |
| 6,454,506 B1 | * | 9/2002 | Keller et al. | 411/387.4 |
| 7,214,020 B2 | * | 5/2007 | Suzuki | 411/417 |
| 7,780,388 B2 | * | 8/2010 | Yamaki | 411/386 |
| 7,938,609 B2 | * | 5/2011 | Mori et al. | 411/386 |

FOREIGN PATENT DOCUMENTS

| | | |
|---|---|---|
| DE | 102004029305 A1 | 2/2006 |
| JP | 09-317732 A1 | 12/1997 |
| JP | 10-103321 A | 4/1998 |
| JP | 2002-038653 A | 2/2002 |
| JP | 2003-206921 A1 | 7/2003 |
| JP | 2006-057801 A | 3/2006 |
| JP | 2007-107693 A1 | 4/2007 |

* cited by examiner

*Primary Examiner* — Flemming Saether

(57) ABSTRACT

A self-tapping including a normal thread (10) and a female screw molding thread (12) having a larger diameter than that of the normal thread (10), out of pitches of the normal thread (10) positioned in a head portion side from the female screw molding thread (12), any one pitch is set to be larger than other pitches. The self-tapping not only reduces driving torques but also improves fastening force, and thus can be applied to various workpieces made of the soft material as well as a hard material.

4 Claims, 6 Drawing Sheets

SELF-TAPPING SCREW

TECHNICAL FIELD

The present invention relates to a screw for mounting a component on a workpiece made of a soft material such as an aluminum alloy, a magnesium alloy or a resin, and particularly to a self-tapping screw which is screwed to a prepared screwless hole formed on a workpiece made of such a soft material while molding a female screw.

BACKGROUND ART

In recently popular electronic products such as mobile phones, personal computers and portable music players, an aluminum alloy is widely used in view of weight saving, downsizing and good workability and a plurality of screws are used to mount a component thereon.

Therefore, as an example of such a screw, Japanese Patent No. 4490358 discloses a self-tapping screw. The self-tapping screw includes a normal thread molded in a leg portion and a female screw molding thread having a larger diameter than that of the normal thread, and is configured such that the female screw molding thread is screwed to a workpiece while molding a female screw. In addition, any pitch of the normal thread is set to be the same as each other. According to the configuration, in fastening and rotating, both flank surfaces of the normal thread do not come into contact with a female thread. Thus, it is possible to reduce tightening torques and to prevent the workpiece from being cracked.

CITATION LIST

Patent Literature

PTL 1: Japanese Patent No. 4490358

SUMMARY OF INVENTION

Technical Problem

However, in compensation for the configuration, in the self-tapping screw, any flank surface of the normal thread does not come into contact with the female thread in fastening and fixing. Therefore, fastening force cannot be sufficiently obtained and the self-tapping screw is likely to be loosened.

Solution to Problem

In a self-tapping screw in which a normal thread and a female screw molding thread having a larger diameter than that of the normal thread are molded in a leg portion, out of pitches of the normal thread positioned in a head portion side from the female screw molding thread, any one pitch is set to be larger than other pitches.

According to such a self-tapping screw, a distance between a pressure flank surface of the normal thread and a pressure flank surface of the female thread is closer than a distance between a clearance flank surface of the normal thread and a clearance flank surface of the female thread. However, in fastening and rotating, since the normal thread is screwed while being pressed in a fastening direction, contact resistance is insignificant between the pressure flank surface of the normal thread and the pressure flank surface of the female thread. On the other hand, in fastening and fixing, action of axial force causes the pressure flank surface of the normal thread to approach and come into contact with the pressure flank surface of the female thread, thereby increasing fastening force. Therefore, the self-tapping screw of the present invention not only reduces driving torques but also improves the fastening force. Accordingly, it is possible to sufficiently achieve the fastening force without causing cracks even when the self-tapping screw is used in a workpiece made of a soft material such as an aluminum alloy or a resin.

In addition, it is preferable that a pressure flank angle of the normal thread be set to be smaller than a pressure flank angle of the female screw molding thread.

According to the self-tapping screw, in fastening and fixing, a crest of the normal thread is wedged into the pressure flank surface of the female thread. Therefore, it is possible to expect more increased fastening force.

Advantageous Effects of Invention

A self-tapping screw of the present invention can be applied to various workpieces made of a soft material as well as a hard material by using reduced driving torques and increased fastening force.

DESCRIPTION OF EMBODIMENTS

Figure 1:
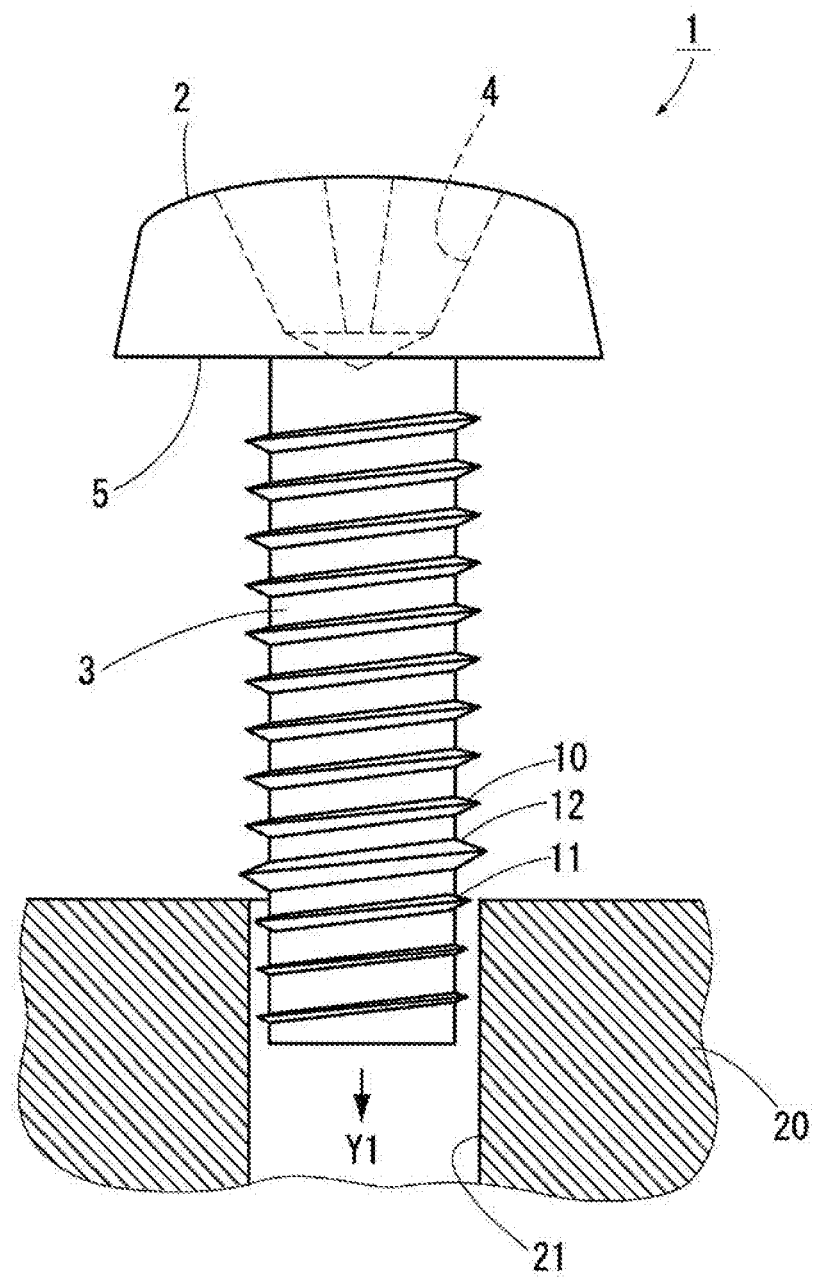
FIG. 1 is an overall view illustrating an embodiment of the present invention.

Hereinafter, a first embodiment of the present invention will be described with reference to FIGS. 1 to 3. Referring to FIG. 1, the reference numeral 1 represents a self-tapping screw formed from a head portion 2 and a leg portion 3 formed integrally therewith, and is made of a hard material such as carbon steel or stainless steel. The head portion 2 has a drive hole 4 in which screw driving force is transmitted to a self-tapping screw 1 from a driver bit (not illustrated). In the leg portion 3 formed integrally with the head portion 2, a normal thread 10 is extended in a spiral shape from the vicinity of a bearing surface 5 of the head portion 2 in a direction where a tip of the leg portion 3 is positioned.

On the other hand, in the tip side of the leg portion 3, a guide thread 11 having a smaller diameter than that of the normal thread 10 is molded. The guide thread 11 is set to have a diameter which is the same as or slightly larger than the diameter of a prepared hole 21 formed on a workpiece 20. The workpiece 20 is made of a soft material such as a resin or an aluminum alloy.

In addition, a female screw molding thread 12 having a larger diameter than that of the normal thread 10 is molded between the normal thread 10 and the guide thread 11. The normal thread 10, the female screw molding thread 12 and the guide thread 11 are molded in the spiral shape and continuously connected to molding threads in the leg portion 3.

Figure 2:
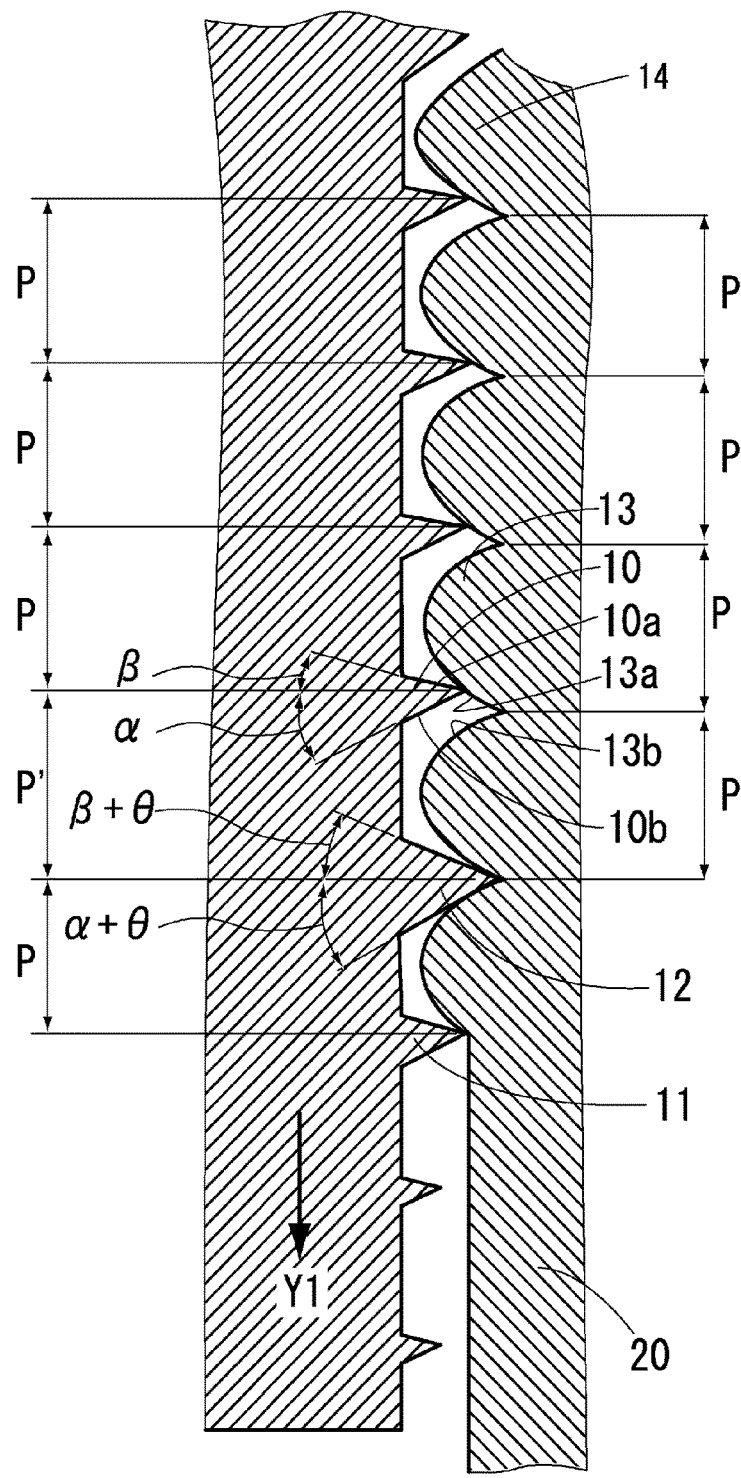
FIG. 2 is a partially enlarged cross-sectional view illustrating a state of fastening and rotating according to the present invention.

As illustrated in FIG. 2, a pitch (P) in a bottom of a female screw 14 molded by the female screw molding thread 12 is determined by a pitch (P) in a crest between the female screw molding thread 12 and the guide thread 11 (denoted as a third pitch). In addition, the pitch (P) in the crest of the normal thread 10 which is positioned in the head portion side from the female screw molding thread 12 (denoted as a second pitch) is set to be similar to the third pitch (P) in the bottom of the female screw 14. However, a pitch (P') between the crest of the female screw molding thread 12 and the crest of the adjacent normal thread 10 (denoted as a first pitch) is set to be larger than the pitch (P) in the crest of the other normal thread 10. This causes the normal thread 10 to be wedged into the female screw 14. Accordingly, the crest of the normal thread 10 is disposed at a position shifted in a direction where a pressure flank surface 13a of a female thread 13 is positioned. According to this configuration, a distance between a pressure flank surface 10a of the normal thread 10 and the pressure flank surface 13a of the female thread 13 is closer than a distance between a clearance flank surface 10b of the normal thread 10 and a clearance flank surface 13b of the female thread 13. In addition, the portions of the first and third pitches are constantly formed along at least 180 degrees of the periphery as seen in FIGS. 1 and 2.

In addition, the normal thread 10 and the female screw molding thread 12 have an asymmetric shape in which a clearance flank angle (α) is large and a pressure flank angle (β) is small. A flank angle of the female screw molding thread 12 is formed to be larger than each flank angle of the normal thread 10 by (θ).

As illustrated in FIG. 2, in a stage of fastening and rotating, the self-tapping screw 1 is screwed while applying thrust force in a direction of an arrow Y1. Therefore, the crest of the normal thread 10 of the pressure flank surface 10a is slightly in contact with the pressure flank surface 13a of the female thread 13. However, in this configuration, contact resistance thereof is insignificant and driving torques are set not to be high. The configuration may be made such that in the stage of the fastening and rotating, the crest of the normal thread 10 of the pressure flank surface 10a is close to an extent not to come into contact with the pressure flank surface 13a of the female thread 13.

Figure 3:
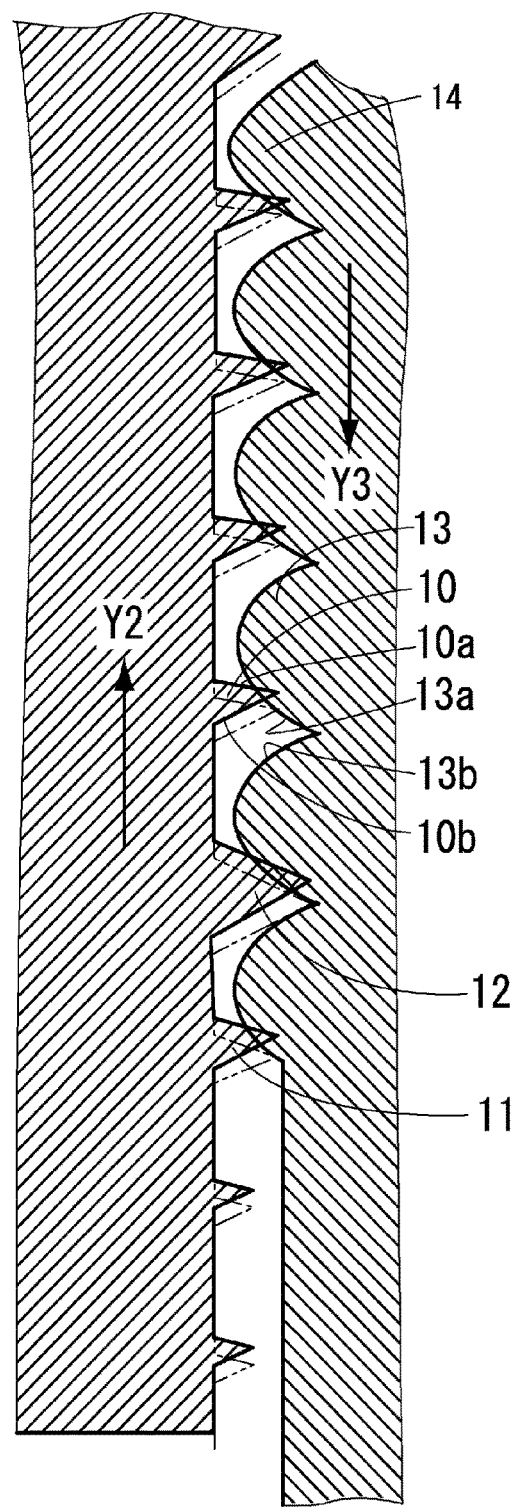
FIG. 3 is a partially enlarged cross-sectional view illustrating a state of fastening and fixing according to the present invention.

On the other hand, as illustrated in FIG. 3, in a stage of fastening and fixing, axial force acting on the self-tapping screw 1 applies a pressure to the self-tapping screw 1 in a direction of an arrow Y2, and applies a pressure to the female screw 14 in a direction of an arrow Y3 which is the opposite direction to the arrow Y2. Therefore, in the stage of the fastening and fixing, the crest of the normal thread 10 of the pressure flank surface 10a and the pressure flank surface 13a of the female thread 13 are closer to each other and come into contact with each other as compared to the stage of the fastening and rotating. Consequently, the contact resistance is increased to obtain strong fastening force. In particular, in the stage of the fastening and fixing, the crest of the normal thread 10 is wedged into the pressure flank surface 13a of the female thread 13 by setting the flank angle of the normal thread 10 and the female screw molding thread 12 as described above. Accordingly, the fastening force is increased as compared to the contact between both surfaces.

Figure 4:
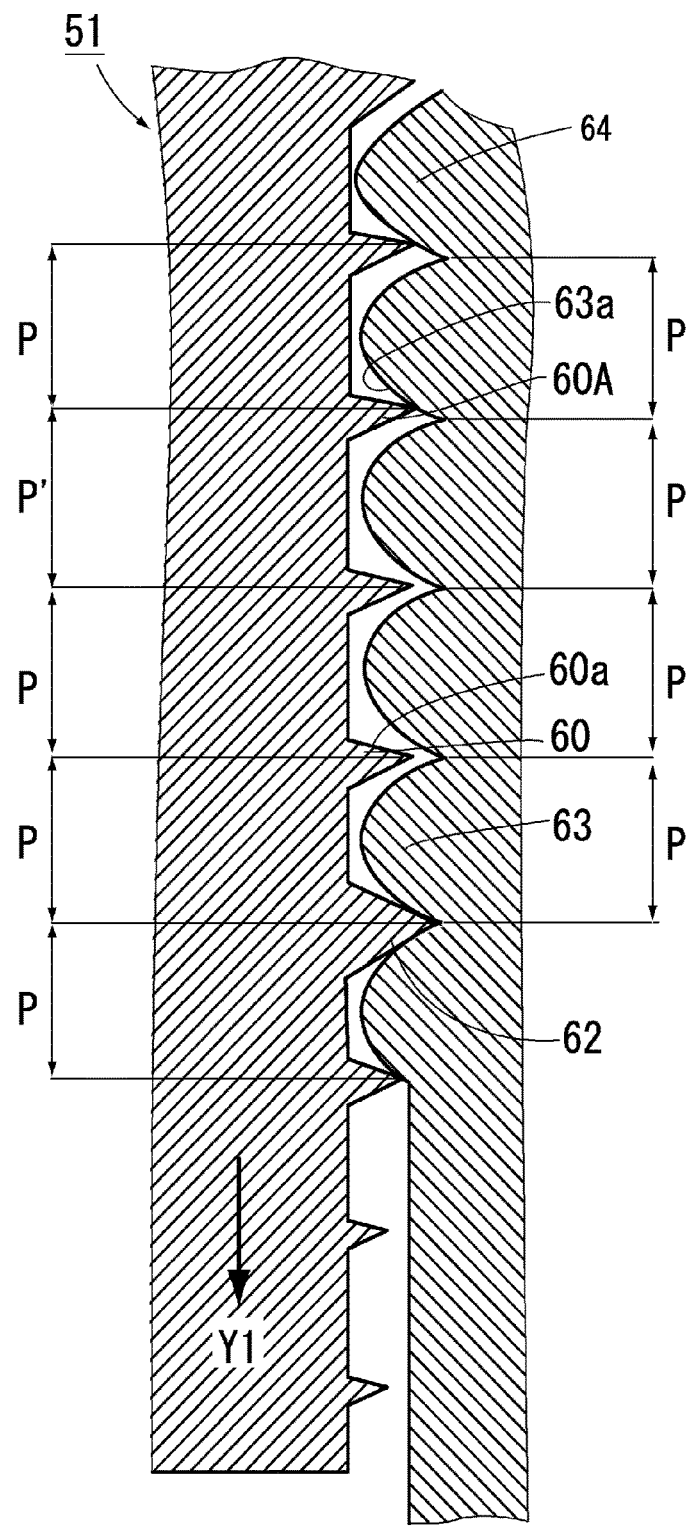
FIG. 4 is a partially enlarged cross-sectional view illustrating a state of fastening and rotating in a second embodiment of the present invention.
Figure 5:
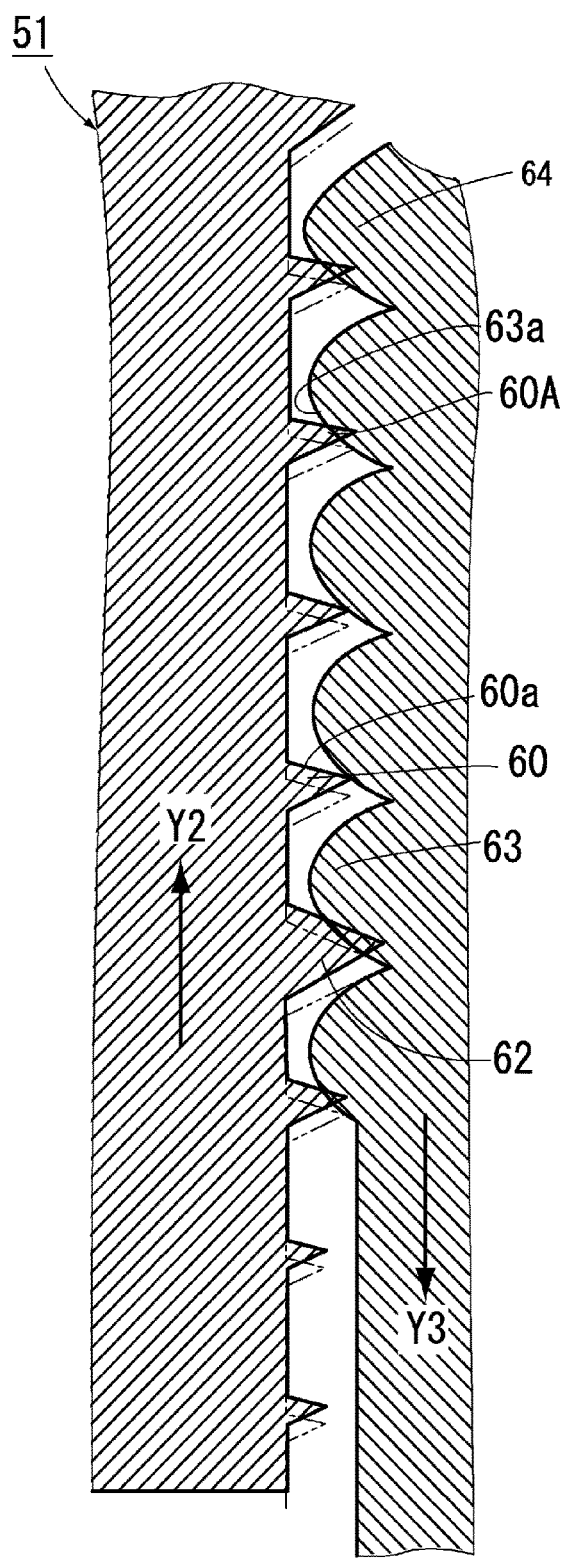
FIG. 5 is a partially enlarged cross-sectional view illustrating a state of fastening and fixing in a second embodiment of the present invention.

Hereinafter, a second embodiment of the present invention will be described with reference to FIGS. 4 and 5. In a self-tapping screw 51 illustrated in the second embodiment, a pitch is differently set compared to the self-tapping screw 1 illustrated in the first embodiment. As illustrated in FIG. 4, a pitch (P) between the crest of a female screw molding thread 62 and a crest of an adjacent normal thread 60 is set to be similar to a pitch (P) in a bottom of a female screw 64. On the other hand, a pitch (P') in a crest of a normal thread 60A positioned in the head portion side is set to be larger than a pitch (P) in a bottom of the female screw 64.

In this manner, in the stage of the fastening and rotating illustrated in FIG. 4, the self-tapping screw 51 has the normal thread 60A which comes into contact with a pressure flank surface 63a of a female thread 63 and a normal thread 60 which does not come into contact therewith. Thus, the driving torques are much lower than those of the self-tapping screw 1 in the first embodiment. On the other hand, in the stage of the fastening and fixing illustrated in FIG. 5, if the axial force is applied, the normal thread 60A further approaches and comes into contact with the pressure flank surface 63a of the female thread 63. However, in the normal thread 60 located in a section between the normal thread 60A and the female screw molding thread 62, even if the axial force is applied, the crest of a pressure flank surface 60a does not come into contact with the pressure flank surface 63a of the female thread 63. Therefore, as compared to the self-tapping screw 1 in the first embodiment, the fastening force is weak.

As described above, it is possible to obtain the most suitable driving torques or fastening force by selectively using the self-tapping screws 1 and 51 illustrated in the first and second embodiments depending on the materials of the workpieces.

Figure 6:
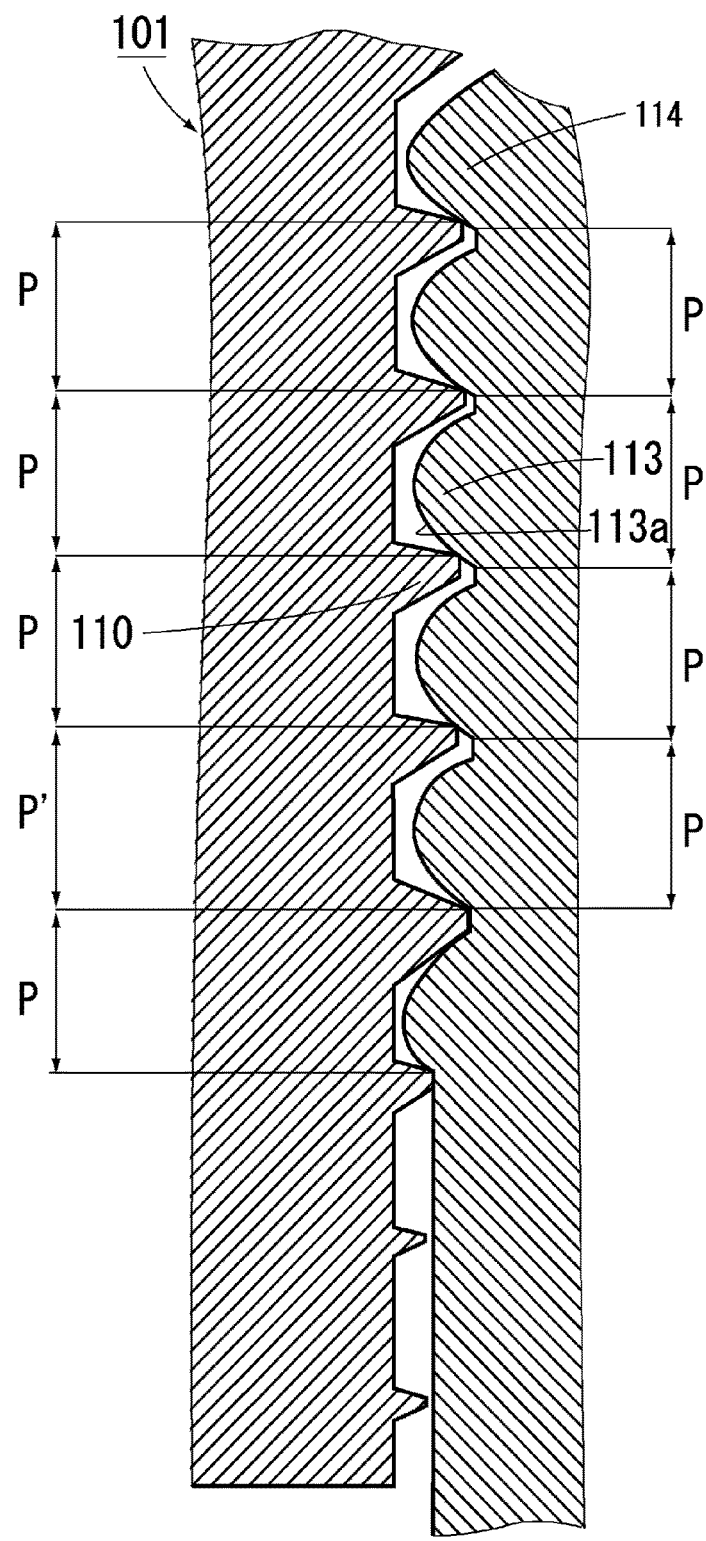
FIG. 6 is a partially enlarged cross-sectional view illustrating a third embodiment of the present invention.

Hereinafter, a third embodiment of the present invention will be described with reference to FIG. 6. In a self-tapping screw 100, a normal thread 110 is formed to have a trapezoidal shape. In this case, a reference line of a pitch of a normal thread 110 is set based on a crest which is positioned on a pressure flank surface 113a side of a female thread 113 in an upper base of the normal thread 110.

In addition, a bottom of a female screw 114 molded by a female screw molding thread 112 having a trapezoidal shape is formed to have a plane. In this case, a pitch line in the bottom of the female screw 114 is set based on an end point where the pressure flank surface 113a of the female thread 113 is positioned.

REFERENCE SIGNS LIST 1 self-tapping screw
2 head portion
3 leg portion
4 drive hole
5 bearing surface
10 normal thread
10a pressure flank surface
10b clearance flank surface
11 guide thread
12 female screw molding thread
13 female screw thread
13a pressure flank surface
13b clearance flank surface
14 female screw
20 workpiece
21 prepared hole

The invention claimed is:
1. A self-tapping screw, comprising: a leg portion, a normal external thread formed on the leg portion, a guide thread formed on a tip side of the leg portion, and a female screw molding thread formed between the normal external thread and the guide thread, the female screw molding thread having a larger diameter than a diameter of the normal external thread, wherein a distance between a pressure flank surface of the normal external thread and a pressure flank surface of a female thread molded via the female screw molding thread, is closer than a distance between a clearance flank surface of the normal external thread and a clearance flank surface of the female thread, wherein a first pitch defined between a crest of the female screw molding thread and a crest of the normal external thread that is adjacent to the crest of the female screw molding thread is longer than a second pitch defined between adjacent crests of the normal external thread, the first pitch being constant along at least 180 degrees spiral of the adjacent female screw molding thread crest and the normal external thread crests, whereby in a stage of rotating, the clearance flank surface and the pressure flank surface of the normal external thread are prevented from coming into contact with the female thread, and in the stage of fastening and fixing, only the crest of the normal external thread is wedged into the pressure flank surface of the female thread by operation of an axial force, and the guide thread includes a smaller diameter portion along at least 180 degrees spiral of the of the guide thread crest than the diameter of the normal external thread.

2. The self-tapping screw according to claim 1,
wherein a pressure flank angle of the normal thread is set to be smaller than a pressure flank angle of the female screw molding thread.

3. A self-tapping screw, comprising: a leg portion, a normal external thread formed on the leg portion, and a female screw molding thread formed on a tip side of the leg portion, the female screw molding thread having a larger diameter than a diameter of the normal external thread, wherein a first pitch defined between a crest of the female screw molding thread and a crest of the normal external thread that is adjacent to the crest of the female screw molding thread is longer than a second pitch defined between adjacent crests of the normal external thread, and the first pitch is constant along at least 180 degrees spiral of the adjacent female screw molding thread crest and the normal external thread crests.

4. A self-tapping screw, comprising: a leg portion, a normal external thread formed on the leg portion, a guide thread formed on a tip side of the leg portion, and a female screw molding thread formed between the normal external thread and the guide thread, the female screw molding thread having a larger diameter than a diameter of the normal external thread, wherein a first pitch defined between a crest of the female screw molding thread and a crest of the normal external thread that is adjacent to the crest of the female screw molding thread is longer than a second pitch defined between adjacent crests of the normal external thread, the first pitch being constant along at least 180 degrees spiral of the adjacent female screw molding thread crest and the normal external thread crests, a third pitch defined between a crest of the guide thread and the crest of the female screw molding screw is equal to the second pitch, and the guide thread includes a smaller diameter portion along at least 180 degrees spiral of the guide thread crest than the diameter of the normal external thread.

* * * * *